J. CHAMBERS.
PIPE COUPLING.
No. 48,517. Patented July 4, 1865.
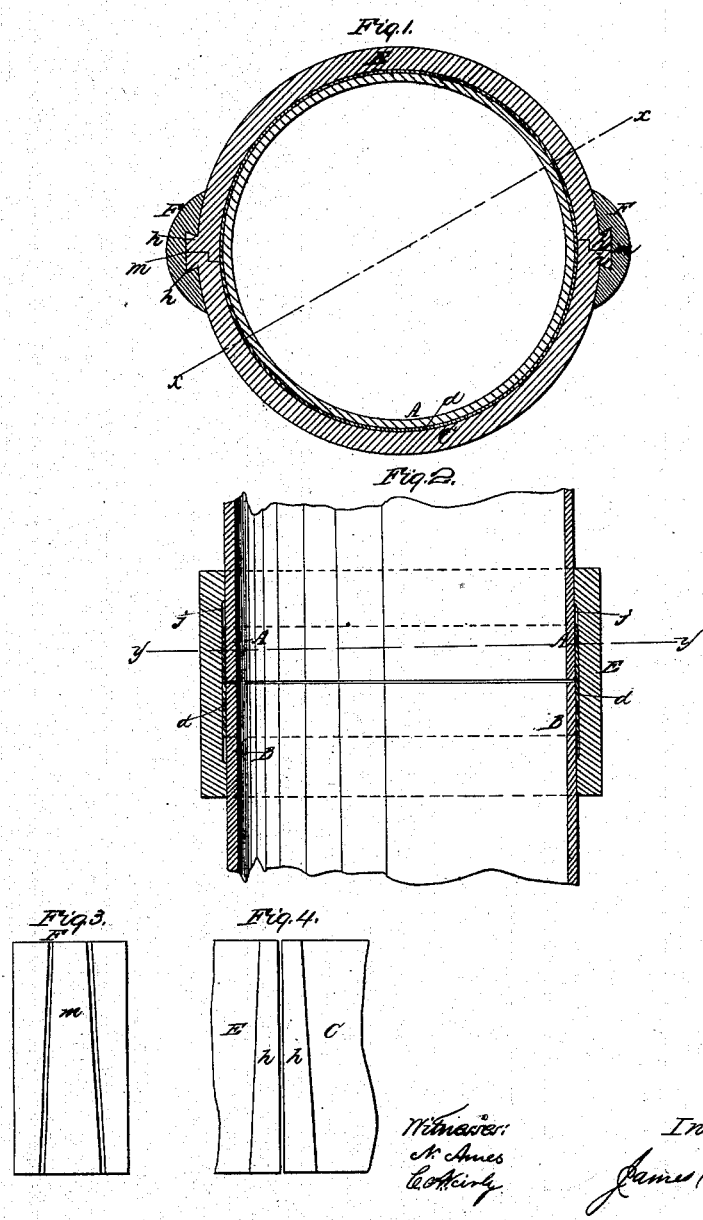

UNITED STATES PATENT OFFICE.

JAMES CHAMBERS, OF BOSTON, MASSACHUSETTS.

PIPE-COUPLING.

Specification forming part of Letters Patent No. 48,517, dated July 4, 1865.

*To all whom it may concern:*

Be it known that I, JAMES CHAMBERS, of Boston, in the county Suffolk and State of Massachusetts, have invented a new and useful Improved Pipe-Coupling; and I do hereby declare that the following is a full, clear, and exact description of the construction and operation of the same, reference being had to the accompanying drawings, forming a part of this specification, in which—

Figure 1 is a transverse section, in the line $y\ y$ of Fig. 2, through a section of pipe, A, showing the packing $d$ and coupling band or clasps E and C. Fig. 2 is a longitudinal central section, in the line $x\ x$ of Fig. 1, through two contiguous sections of pipe, A and B, united by my coupling. Fig. 3 is an inside plan of one of the keys, F, provided with a dovetail wedge-shaped mortise, $m'$, for tightening and holding the sections of the coupling-bands E C; and Fig. 4 is an outside plan of two contiguous edges of the sections of the coupling-band, showing the wedge-shaped cleats or tenons $h\ h$.

Like parts are indicated by the same letters in all the drawings.

The nature of my invention consists in making a pipe-coupling of a ring or cylinder composed of two or more sections, E C, whose contiguous edges are provided with wedge-shaped cleats or tenons $h\ h$, over which are driven keys F F, provided with dovetail wedge-shaped mortises to receive said tenons, whereby I obtain a number of very important advantages over any coupling known or used before, viz:

First, I dispense with screws and save the cost of cutting the same.

Second, by the use of my improvement hubs or sleeves on the contiguous ends of the sections of a pipe may be entirely dispensed with, and any particular joint or section of a long pipe already laid may thus be removed or replaced without cutting or disturbing the neighboring sections, thereby saving a great deal of time, trouble, and expense.

Third, my coupling is also equally applicable to mending leaks or ruptures in a pipe, as it can, with any suitable packing, be readily clasped firmly around any portion of a pipe by any one, as well as by a professional plumber, by simply using a hammer for driving on the keys by which the sections of the coupling-band are united; and, Fourth, my coupling is peculiarly useful for uniting the sections of a rubber or other flexible pipe, (having previously inserted a rigid ring or thimble,) where the usual screw-couplings are much more difficult to apply, requiring one workman to hold the pipe from twisting while another turns the screw.

To enable others skilled in the art to make and use my improvement, I will now proceed to describe the construction and operation of the same.

A and B represent the contiguous ends of two sections of any kind of pipe in general use.

$d$ is a band of rubber, leather, or any other suitable packing—such as putty, asphaltum, &c.—to cover the crack or space between the two sections, and when properly compressed produce a water-tight joint. The coupling band or ring is made of iron, brass, or other suitable material, and consists of two or more sections, E C, the contiguous edges of which are provided with the wedge-shaped beveled cleats or tenons $h\ h$, the form and position of which are clearly shown in Figs. 1 and 4. The inner side of the coupling ring is provided with an annular recess, $j$, for the reception of the packing $d$, as represented in Fig. 2. In the drawings, Fig. 1, the coupling-band is represented as being composed of only two sections, E and C. It is obvious, however, that three, four, or even more sections might be embraced in the ring, if required.

F F are the keys, of iron, brass, or other suitable material, shaped as clearly shown in Figs. 1 and 3, being provided with a wedge-shaped dovetail mortise, $m$, to receive the cleats or tenons $h\ h$. The packing $d$ having been properly applied and the sections E C placed around it, these keys F F are driven over the cleats $h\ h$, the action of which will obviously draw the contiguous edges together and force the packing firmly around the pipe; or screws passed through the cleats $h\ h$ may be used instead of the keys F F.

Having thus described the construction and operation of my improvement, what I claim as new, and desire to secure by Letters Patent, is—

A pipe-coupling composed of two or more sections of a cylinder, having their contiguous edges provided with cleats or tenons $h\ h$, and fastened to keys F F, provided with dovetail wedge-shaped mortises $m$, or their equivalents, substantially as set forth, and for the purpose described.

JAMES CHAMBERS.

Witnesses:
N. AMES,
C. A. KIRBY.